Sept. 24, 1940.  A. CLAUD-MANTLE  2,215,870

ASSIST CORD ASSEMBLY

Filed Feb. 2, 1940  2 Sheets-Sheet 1

Inventor
Arthur Claud-Mantle
By Rockwell & Bartholow
Attorneys

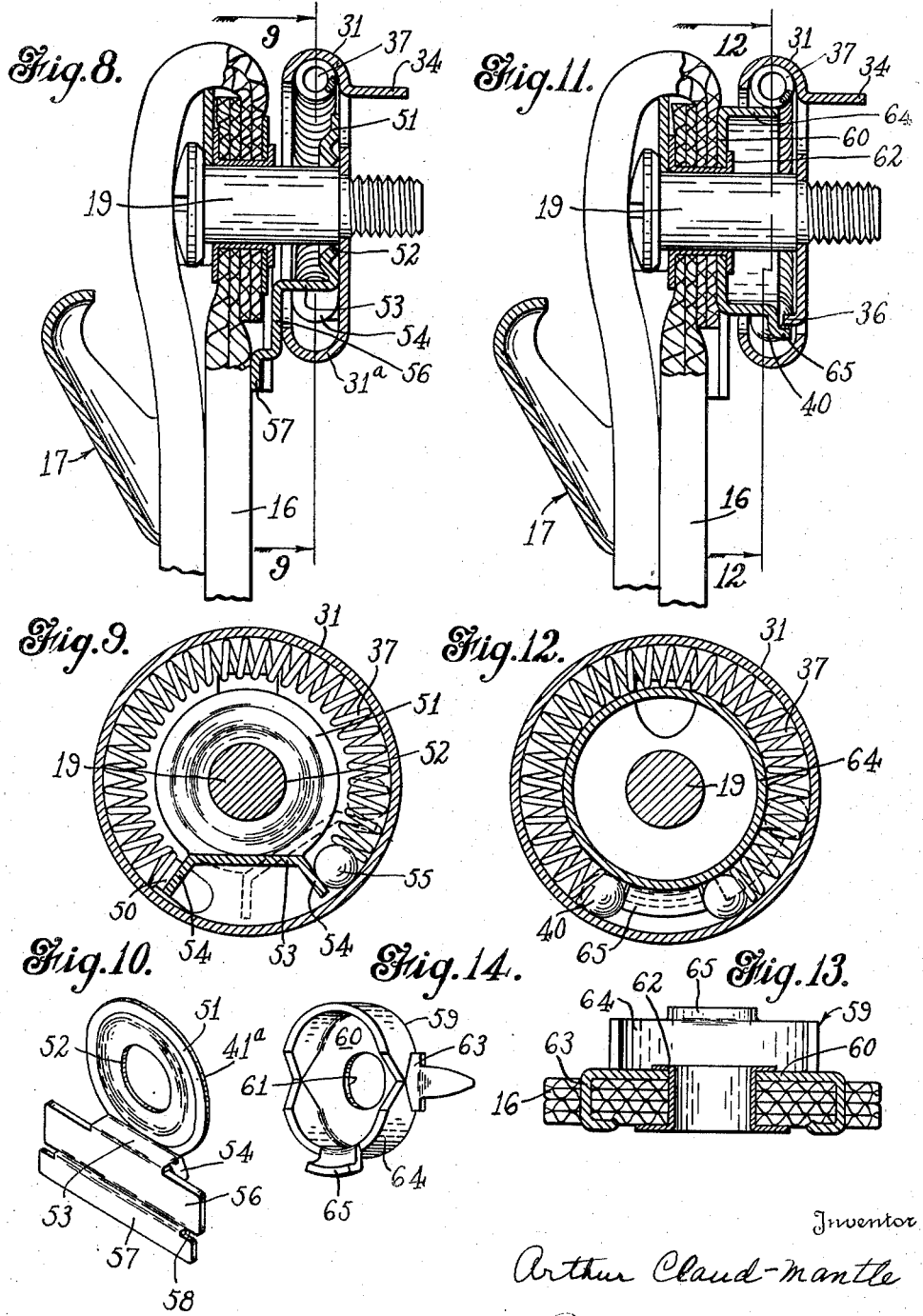

Patented Sept. 24, 1940

2,215,870

UNITED STATES PATENT OFFICE 2,215,870

ASSIST CORD ASSEMBLY

Arthur Claud-Mantle, Trumbull, Conn., assignor to The Bassick Company, Bridgeport, Conn., a corporation of Connecticut Application February 2, 1940, Serial No. 316,934

18 Claims. (Cl. 105—354)

This invention relates to assist cords such as used in motor cars.

One of the objects of the invention is to provide an improved assist cord of the spring-controlled type, where the body of the assist member is in the form of a strap or web, and where the assist member is swingable in the plane of the strap or web material. Such a device is useful where the assist member is mounted in proximity to a forwardly and upwardly inclined mullion or quarterpost of an automobile body, for the assist strap, which is usually in the form of a loop, may normally have an inclined position so as to be concealed behind the mullion, although when in use capable of being swung into various other positions, including a vertical position. When released, the assist member is returned by the spring to the normal position. Such a spring-controlled device is useful also in other relations.

Another object is to provide an assist cord assembly in which a retainer or trim member is movably but permanently mounted on an assist member in the form of a closed loop of textile or like material, so that the handling of the device and its mounting upon the car body can be performed more efficiently and conveniently.

A further purpose which I have in view is the provision of an assist cord assembly having numerous advantages in use, and which, nevertheless, is of relatively simple and inexpensive construction.

To these and other ends the invention consists in the novel features and combinations of parts to be hereinafter described and claimed.

In the accompanying drawings:

Fig. 8 is a view similar to Fig. 3 illustrating a modified form in which the assist member can be swung from the normal position in one direction only;

Fig. 9 is a section on line 9—9 of Fig. 8;

Fig. 10 is a detail perspective view, looking from the front, of the spring pressed member used in the device of Figs. 8 and 9;

Fig. 11 is a view similar to Fig. 8 showing a further modified form of the device;

Fig. 12 is a section on line 12—12 of Fig. 11;

Fig. 13 is a transverse section of the upper portion of the loop member employed in this form, showing the spring pressed member that is attached to the loop; and Fig. 14 is a detail perspective view, looking from the rear, of the spring pressed member.

Figure 1:
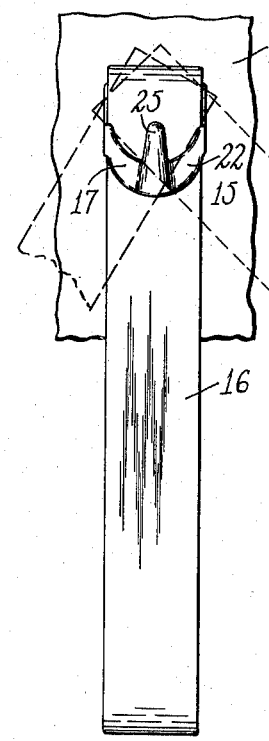
Fig. 1 is a front elevation of an assist cord assembly embodying my improvements, the car body wall being illustrated in a fragmentary manner, and the normal position of the assist member being illustrated as vertical in this particular instance.
Figure 2:
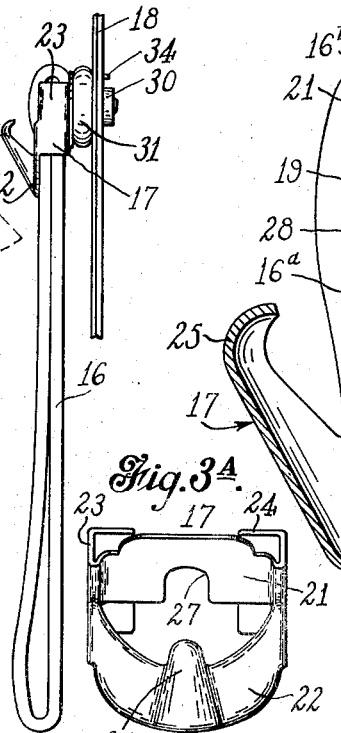
Fig. 2 is a side elevation of the parts shown in Fig. 1.

In the past it has been common practice to form the assist member of strap or web material, with a front flap and a back flap fastened together near the top, and there attached to the car body wall, there being a forward and downward extension from the rear flap in the form of a free end or tab which is held in place by a medallion loop or retainer fastened to the wall. In those forms of my invention which I prefer, this type of assist member is no longer employed, and I provide as a substitute a permanently assembled unit, one member of which is constituted by a strap or web having its extremities permanently interconnected to form a full or complete loop with rounded ends, and the other member of which is constituted by a retainer or trim member slidable along the loop but incapable of being separated therefrom.

In the drawings, the unit referred to is shown at 15, the loop part thereof being indicated at 16 and the retainer at 17, and the retainer being attached to the wall 18 of the car body by a fastening member such as the screw 19. The loop proper 16 can be made of the usual textile web or strap material, and may have the usual edge binding and other features of construction which I have not considered it necessary to illustrate. The loop is formed by cutting off a suitable length of material, looping it, slightly overlapping it at the extremities 16$^a$ and 16$^b$, and interconnecting the overlapped ends by stitching them together and passing therethrough a grommet 20 of a size such as to fit the body of the screw 19.

The structure of the retainer 17 will be apparent from Figs. 1 to 3 and 3A, and it will be observed that this member is of such a character that it can, if desired, be formed from a single piece of sheet metal, properly bent and shaped for the purposes in view. This member, in the example shown, has a plate or body portion 21 at the upper part, and a medallion loop 22 at the lower part, and side walls 23 terminating at the rear in inwardly turned retaining flanges or lips 24. The part 21 is displaced somewhat in a rearward direction with respect to the portion 22, and both of these portions are connected integrally with the side walls 23, the result being that there is provided a closed passageway for accommodating the outer portion or flap of the loop, and at the rear of the member a passageway adapted to accommodate the rear portion of the loop, the last-named passageway, however, being open at the rear between the opposing edges of the flanges 24. The plate portion 21 is provided at its middle with a notch 27 cut into it from the lower edge, the size of this notch being such as to accommodate nicely the body of the screw 19. The keeper or clip portion 22 of the retainer member is preferably bowed downwardly so that its middle portion is lowermost; and I prefer to form integrally with this portion an upwardly and outwardly projecting hook 25, which is adapted to serve as a garment hook.

Figure 3:
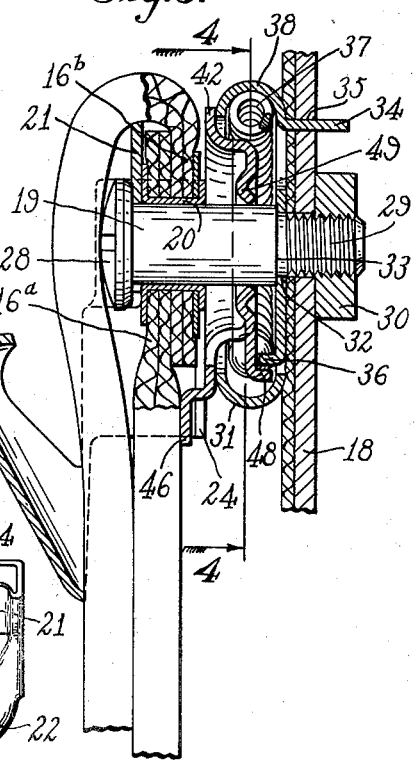
Fig. 3 is an enlarged vertical sectional view of the upper part of the assembly.
Figure 3A:
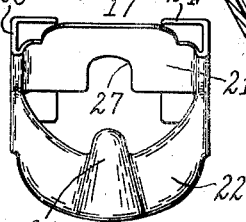
Fig. 3A is a detail perspective view of the retainer member for the assist loop.

It will be observed that in the assembled position of the assist cord, the flexible loop 16 is supported by the screw 19 and the retainer member 17, in the relation shown in Fig. 3, the retainer member being located closely adjacent the upper end of the loop, with the rear member of the loop in the rear passageway of the retainer, and the front member of the loop in the front passageway. The notch 27 fits around the body of the screw 19, said screw having a nicked head 28 abutting the outer face of portion 21, and the grommet 20 being disposed about the body of the screw. The screw 19 has a portion of its shank threaded, as shown at 29, so as to engage a threaded part 30 welded or otherwise suitably affixed to the wall 18 in order to provide a satisfactory socket for the screw. By the construction described, the loop, with its metal retainer member, is mounted for swinging movement relative to the axis provided by screw 19, the swinging movement being in the plane of the strap material of which the loop is constructed.

I provide in association with the screw or like fastener 19, and between the rear face of the loop member and the front face of the car body wall, a spring mechanism which controls the angular position of the loop member, and in particular serves to return the same to a predetermined normal position after it has been swung on its pivotal mounting. In the form of the device now being described, this spring control mechanism is constructed as follows: Behind the loop and around the screw 19 is located a round case 31 in the form of a shallow cup having an opening 32 adapted to receive a shouldered portion 33 on the shank of screw 19. This cup-like case is also preferably provided in its rear wall with a struck-up tongue 34 rearwardly directed, adapted to be received in a correspondingly formed opening 35 in the supporting wall so as to prevent the cup from rotating. At the lower part of its rear wall the cup is provided with a forwardly directed arcuate lug 36. This lug is adapted to hold in operative position a spring for controlling the swinging movement of the assist loop, and this spring is preferably constituted by a coil or helix 37 of fine spring wire. The spring coil, when in the operative position, is given a curved or arcuate shape, the form of the spring being approximately circular. The spring is held in this position within the retaining cup 31, previously described, this cup having its peripheral wall curled or curved over, as shown at 38, so that after the spring has been compressed endwise to a certain degree, and inserted into the cup-shaped case, it will be retained in the curved form.

Figure 4:
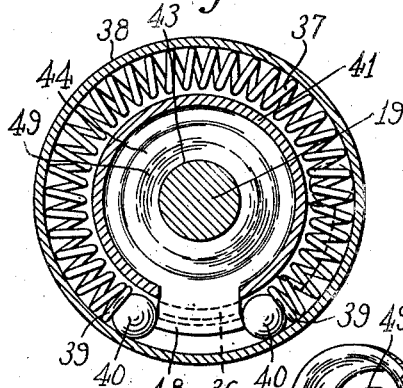
Fig. 4 is a section on line 4—4 of Fig. 3.
Figure 5:
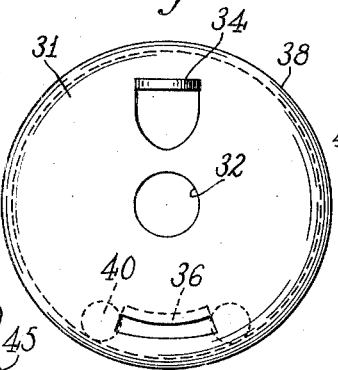
Fig. 5 is a detail rear view of the spring case.
Figure 6:
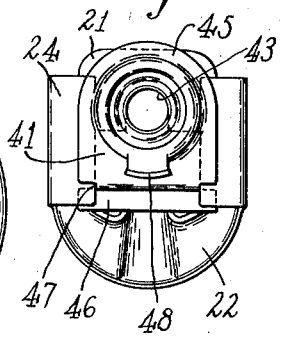
Fig. 6 is a detail view, looking from the rear, showing the relation of the retainer for the loop to the rockable spring pressed member.
Figure 7:
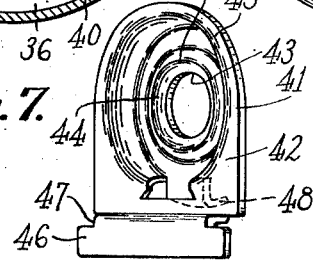
Fig. 7 is a detail perspective view of the spring pressed member, looking from the front.

The extremities of the coil are shown in Fig. 4 at 39, and it will be observed that between the respective extremities and the respective ends of arcuate lug 36, small steel balls 40 are interposed. Overlying and partially fitting within the cup-shaped case 31 is a rockable spring pressed member 41, which is disclosed in detail in Fig. 7. This member is formed as a sheet metal plate having a body portion 42 provided with a perforation 43 whereby it is adapted to fit around the screw 19. Immediately surrounding the perforation 43 is an inwardly dished annular portion 44 which is disposed within the cup-shaped case approximately in the plane of the curved spring. Outwardly of the dished portion the plate has a curved rim portion 45 at the upper part thereof adapted to rest against the peripheral portion of the cup-shaped case, as shown in Fig. 3. At the lower part of the plate its side edges are substantially parallel to each other, and a transverse forwardly displaced lug 46 is made integral with the plate, this lug being adapted to rest against the rear surface of the textile loop in the manner shown in Fig. 3, and to confine the loop in the lower portion of the metal retainer, previously described. Between the extremities of the lug 46 and the lower part of the plate body are cut-away portions 47. The construction is such that the cut-away portions 47 are adapted to engage the edge portions of the inturned flanges of the metal retainer 17, with the lug 46 disposed in front or forwardly of these flanges, as shown in Figs. 3 and 6, whereas the side portions of body 42 lie against the rear faces of said flanges.

The member 41 is adapted to act on the coil spring through a tongue or lug 48, which is struck up from the body portion of member 41 adjacent the lower part thereof, and is adapted to be positioned within the cup-shaped case adjacent and immediately below the lug 36 which separates the balls 40 from each other. The lateral extent of the integral rearwardly extending tongue 48 is substantially the same as that of the lug 36, so that swinging movement of the plate in one direction or the other will cause the tongue 48 immediately to engage one of the balls 40 and compress the spring against the action of one end of the arcuate lug 36, which, acting through the other ball, will hold the spring in place so that it can be compressed. Thus when the assist member normally has the position shown in Fig. 1, in which position it is held by the spring 37, said assist member can be swung either to the right or to the left, and after being released will be restored by the spring to the initial position. Also, it may be noted that the construction is such as to permit a considerable amplitude of the swinging movement before the spring is fully compressed and therefore prevents further movement. In the particular case illustrated, the assist member can be swung through an angle of about 90°, but obviously I do not limit myself to any particular maximum angle.

The manner of assembling the device will be clear from the foregoing description. As previously indicated, the screw 19 is provided with a shouldered portion engaging the rear wall of the cup-shaped case 31, so as to hold the case in place against the supporting wall. To facilitate assembly, the portion of the spring pressed plate which immediately surrounds the screw 19 is given a conical shape, as shown at 49 in Fig. 3, so that the shouldered part of the screw will be centralized and enabled to pass readily through the perforation 43. In this form, the spring pressed plate has motion transmitted to it by the swinging movement of the metal retainer on and about the screw 19, said metal retainer having parallel rear edges by means of which it is detachably interlocked with the spring compressing plate in the manner above described. By this arrangement, swinging movement imparted to the metal retainer member 17 will be immediately transmitted to the spring compressing member, which is adjacent the rear portion of the metal retainer member and has portions straddling the edges of the rear flanges of the metal retainer member.

It will be obvious that the device can be very readily assembled, and that the metal fixture parts are relatively simple and inexpensive. The spring mechanism is in small compass, and is well concealed behind the upper part of the assist loop. The operation of applying the assist device to the car body can be carried out with great facility and convenience.

In the modified form shown in Figs. 8, 9 and 10, the construction is generally similar to that previously described, the principal difference being that in this instance the loop is free to swing from the normal position in one direction only. In this instance, with the loop having a normal position such as shown in Fig. 1, the loop can be swung, with reference to that figure, only to the right. Here the structure of the textile loop, its metal retainer, and the screw, is the same as before, also the spring 37, but the spring case 31ᵃ is slightly different and the spring pressed plate 41ᵃ is also of a somewhat different construction. Instead of being provided with a lug 36, such as previously described, the spring case is provided in its rear wall in the lower part thereof, slightly to one side of the center, with a small forwardly projecting tongue 50, which acts as a stationary abutment for one end of the spring, as shown in Fig. 9. The spring compressing plate 41ᵃ has a small annular portion 51 lying against the back of the spring case and provided with a flared opening 52 for the body of screw 19. At the lower portion of the annular part 51, the latter is made integral with a lug portion 53 bent at right angles thereto and having angularly bent end portions 54. In the normal position of the device one of these end portions 54 takes up against the tongue or lug 50, as shown in Fig. 9, while the other portion 54 engages a ball 55 by means of which compressive action is exerted on the spring. From the lug portion 53, which is disposed within the spring case, the member 41ᵃ continues downwardly in the form of a plate portion 56 having a lower offset 57 and end notches 58. By constructing the plate in this manner it is possible to interlock it with the flanged rear portion of the retainer 17 in a manner similar to that previously described. In the assembled position the part 57 engages the rear flap of the loop in the manner shown in Fig 8, and is disposed forwardly of the rear flanges of the retainer. The edges of the flanges are engaged by the portions having the notches 58, and the main portion of part 56 is disposed rearwardly of the flanges. It is thought that the manner of assembling and operating the device will be apparent.

In the form shown in Figs. 11 to 14 the spring pressed plate or member, instead of being detachably interlocked with the metal retainer at the rear of the latter, is fastened to and carried by the loop member as a permanent part thereof. The loop member and the grommet are arranged as before, but surrounding the grommet at the rear face of the loop is the plate 59, preferably of sheet metal, which plate acts to compress a spring 37. The arrangement and form of the spring 37 and case 31 are as in the form shown in Figs. 1 to 7, inclusive. The body portion 60 of plate 59 has an opening 61 by means of which it is fitted around the rear portion of the grommet in front of the grommet flange 62. The plate 59 has pronged side lugs 63 which extend through and are clinched in the fabric in the manner shown in Fig. 13. The initial shape of the pronged side lugs is shown in Fig. 14. The plate 59 is further provided with an integral peripheral rearwardly directed wall 64 entering the spring case, as shown in Fig. 11, and provided at the lower part with an integral rearwardly directed lug 65 lying below the inwardly directed lug 36 of the spring case and adapted to engage and shift either of the balls 49, as in the form first described. The peripheral wall 64 is of such a diameter that it will fit nicely between the rear flanges of the metal retainer 17. As in all the forms described, the metal retainer is freely slidable on the fabric loop, one portion or flap of the loop being held permanently in the front passageway of the retainer, while the other flap or portion of the loop is engageable with and disengageable from the flanged open rear portion of the retainer.

While I have shown and described several forms of my improved assist cord assembly, it will be understood that my invention can be embodied in many other forms, and that further modifications and changes in the organization and in the details of the parts may be made without departing from the principles of the invention or the scope of the claims.

What I claim is:

1. In an assist cord assembly, the combination of an assist member in the form of a loop of strap material having approximately parallel portions facing each other, a fastener member having a shank serving as a pivotal mounting for said loop member adjacent the upper end thereof and providing for the swinging movement of the side portions of the member in the respective planes in which their strap material is disposed, a case into which said fastener member extends adapted for mounting on the side of the car body, and means including a coil spring in the case having its axis arranged on an arc acting on the loop member to hold it normally in a predetermined position in its plane of swing.

2. In an assist cord assembly, the combination of an assist member in the form of a loop of strap material having approximately parallel portions facing each other, a fastener member having a shank serving as a pivotal mounting for said loop member adjacent the upper end thereof and providing for the swinging movement of the side portions of the member in the respective planes in which their strap material is disposed, a case into which said fastener member extends adapted for mounting on the side of the car body, and means including a coil spring in the case having its axis arranged on an arc acting on the loop member to hold it normally in a predetermined position in its plane of swing, said means further comprising a spring compressing member located rearwardly of the loop and movable thereby.

3. In an assist cord assembly, the combination of an assist loop member, a fastener serving as a pivotal mounting therefor on a supporting wall, a case back of the loop member extending around the fastener, and spring means in the case including a coil spring arranged on an arc concentric with the fastener and acting on the loop member in the plane in which it is adapted to swing.

4. In an assist cord assembly, the combination of an assist loop member, a fastener serving as a pivotal mounting therefor on a supporting wall, a case back of the loop member extending around the fastener, and spring means in the case including a coil spring arranged on an arc concentric with the fastener and acting on the loop member in the plane in which it is adapted to swing, said loop member being swingable from its normal position against the action of said spring in either of two directions.

5. In an assist cord assembly, the combination of an assist loop member, a screw serving as a pivotal mounting therefor on a supporting wall, a round case back of the loop member around the screw, a coil spring arranged on a curved axis in the peripheral portion of said case, and means for compressing said spring by causing swinging movement of the loop member.

6. In an assist cord assembly, the combination of an assist loop member, a screw serving as a pivotal mounting therefor on a supporting wall, a round case back of the loop member around the screw, a coil spring arranged on a curved axis in the peripheral portion of said case, and means for compressing said spring by causing swinging movement of the loop member, including a spring compressing plate disposed around the screw at the rear of the loop.

7. In an assist cord assembly, the combination of an assist loop member, a screw serving as a pivotal mounting therefor on a supporting wall, a round case back of the loop member around the screw, a coil spring arranged on a curved axis in the peripheral portion of said case, and means for compressing said spring by causing swinging movement of the loop member, including a spring compressing plate disposed around the screw at the rear of the loop, said plate being adapted to act on an end of the spring to compress the same.

8. In an assist cord assembly, the combination of an assist loop member, a screw serving as a pivotal mounting therefor on a supporting wall, a round case back of the loop member around the screw, a coil spring arranged on a curved axis in the peripheral portion of said case, and means for compressing said spring by causing swinging movement of the loop member, including a spring compressing plated disposed around the screw at the rear of the loop, said plate being adapted to act on the ends of the spring to compress the same.

9. In an assist loop assembly, a flexible strap in the form of a continuous loop having a perforation in one side thereof, a fastener passing through said perforation into a supporting wall, a trim member supported by said fastener having a loop or keeper embracing the outer side member of the looped strap, and spring-actuated means arranged around the fastener behind the loop for controlling the position of the loop.

10. In an assist loop assembly, a flexible strap in the form of a continuous loop having a perforation in one side thereof, a fastener passing through said perforation into a supporting wall, a trim member supported by said fastener having a loop or keeper embracing the outer side member of the looped strap, and spring-actuated means arranged around the fastener behind the loop for controlling the position of the loop, said spring-actuated means including a spring energizing member swingable with the loop.

11. In an assist loop assembly, a flexible strap in the form of a continuous loop having a perforation in one side thereof, a fastener passing through said perforation into a supporting wall, a trim member supported by said fastener having a loop or keeper embracing the outer side member of the looped strap, and spring-actuated means arranged around the fastener behind the loop for controlling the position of the loop, said spring-actuated means including a spring energizing member operable from said trim member as the loop is swung on the axis of said fastener.

12. In an assist loop assembly, a flexible strap in the form of a continuous loop having a perforation in one side thereof, a fastener passing through said perforation into a supporting wall, a trim member supported by but detachably related to said fastener and permanently retained on said loop, a plate member at the rear of the loop engageable with said trim member and adapted to be swung thereby, and a controlling spring for the loop engaged by said plate member.

13. In an assist loop assembly, a flexible strap in the form of a continuous loop having a perforation in one side thereof, a fastener passing through said perforation into a supporting wall, a trim member supported by but detachably related to said fastener and permanently retained on said loop, a plate member at the rear of the loop engageable with said trim member and adapted to be swung thereby, and a controlling spring for the loop engaged by said plate member, and adapted to be compressed by swinging movement of the plate member in either of two directions.

14. In an assist loop assembly, a flexible strap in the form of a continuous loop having a perforation in one side thereof, a fastener passing through said perforation into a supporting wall, a trim member supported by but detachably related to said fastener having an open rear portion, a plate detachably interlocked with said open rear portion of the trim member, and spring mechanism acting on said plate and normally holding the loop in a predetermined angular position.

15. In an assist loop assembly, a flexible strap in the form of a continuous loop having a perforation in one side thereof, a fastener passing through said perforation into a supporting wall, a trim member supported by but detachably related to said fastener having an open rear portion, a plate detachably interlocked with said open rear portion of the trim member, and spring mechanism normally holding the loop in a predetermined angular position and acting on said plate, said spring mechanism including a spring helix having an arcuately disposed axis.

16. In an assist loop assembly, a flexible strap in the form of a continuous loop having a perforation in one side thereof, a fastener passing through said perforation into a supporting wall, a trim member supported by but in detachable relation to said fastener slidable along said loop and having an open rear portion, a plate secured to said loop independently of said trim member at the rear face of the loop, and a coil spring on a curved axis acting on said plate to hold the loop in a predetermined angular position.

17. In an assist loop assembly, a flexible strap in the form of a continuous loop having a perforation in one side thereof, a fastener passing through said perforation into a supporting wall, a spring disposed around the fastener behind the loop and acting on the loop to hold it normally in a predetermined angular position, and a case in which the spring is enclosed.

18. In an assist loop assembly, the combination of a loop member, a fastener by means of which it is swiveled on a supporting wall, a round case attached to the wall around the fastener behind the loop member and having a forwardly projecting curled rim, and also having a forwardly directed lug struck up from its rear wall, a helical spring held in the curled rim of the case and having its respective ends adjacent the ends of said lug, balls interposed between the ends of the spring and the ends of the lug, a plate having a lug interposed between said balls and adapted to compress said spring from either end, and means for connecting said plate with the loop member so that the plate swings with the loop member.

ARTHUR CLAUD-MANTLE.